United States Patent
Kowalski et al.

(10) Patent No.: US 9,866,090 B2
(45) Date of Patent: Jan. 9, 2018

(54) INSPECTION DEVICE FOR A MACHINE

(71) Applicant: Siemens Aktiengesellschaft, Munich (DE)

(72) Inventors: Waldemar Kowalski, Mulheim an der Ruhr (DE); Christoph Lehmann, Neukirchen-Vluyn (DE)

(73) Assignee: Siemens Aktiegesellschaft, Munich (DE)

( * ) Notice: Subject to any disclaimer, the term of this patent is extended or adjusted under 35 U.S.C. 154(b) by 348 days.

(21) Appl. No.: 14/415,588

(22) PCT Filed: Jun. 17, 2013

(86) PCT No.: PCT/EP2013/062470
§ 371 (c)(1),
(2) Date: Jan. 18, 2015

(87) PCT Pub. No.: WO2014/016052
PCT Pub. Date: Jan. 30, 2014

(65) Prior Publication Data
US 2015/0207385 A1    Jul. 23, 2015

(30) Foreign Application Priority Data

Jul. 27, 2012   (EP) .................................... 12178233

(51) Int. Cl.
*H02K 9/10*       (2006.01)
*H02K 5/12*       (2006.01)
(Continued)

(52) U.S. Cl.
CPC .............. *H02K 9/10* (2013.01); *G01M 99/00* (2013.01); *H02K 5/12* (2013.01); *H02K 15/00* (2013.01);
(Continued)

(58) Field of Classification Search
CPC ............ H02K 9/10; H02K 5/12; H02K 15/00; G01M 99/00; B64C 2201/024; B64C 2201/127; Y10S 901/01; Y10S 901/44
See application file for complete search history.

(56) References Cited

U.S. PATENT DOCUMENTS 4,818,990 A    4/1989  Fernandes
5,020,234 A    6/1991  Dailey
(Continued)

FOREIGN PATENT DOCUMENTS

EP    0415042 A2    3/1991
EP    2096738 A1    9/2009
(Continued)

OTHER PUBLICATIONS

English Machine Translation of Tsutomu, JP S63-6300, Jan. 12, 1988, Translated Online Feb. 23, 2017.*

*Primary Examiner* — Hezron E Williams
*Assistant Examiner* — David Z Haung
(74) *Attorney, Agent, or Firm* — Beusse Wolter Sanks & Maire

(57) ABSTRACT

An electric machine such as for example, an electric generator, is provided having a lock system which enables a monitoring device to be housed in the machine such that the generator is not required to be purged. The machine, which can be filled with a gas, with a housing, wherein a first chamber is arranged on the housing, wherein a first flap valve is arranged between the housing and the first chamber, creating a fluidic connection between said housing and first chamber, and a second chamber which is arranged on the first chamber, wherein a second flap valve is arranged between the first and the second chambers, creating a fluidic connection between said first chamber and second chamber, (Continued)

wherein a monitoring device for inspection purposes is provided in the housing.

8 Claims, 1 Drawing Sheet

(51) Int. Cl.
*H02K 15/00* (2006.01)
*G01M 99/00* (2011.01)
(52) U.S. Cl.
CPC .. *B64C 2201/024* (2013.01); *B64C 2201/127* (2013.01); *Y10S 901/01* (2013.01); *Y10S 901/44* (2013.01)

(56) References Cited

U.S. PATENT DOCUMENTS

| | | |
|---|---|---|
| 6,343,239 B1 | 1/2002 | Toda et al. |
| 6,634,593 B2 | 10/2003 | Chastang |
| 7,866,421 B2 | 1/2011 | Fischer |
| 2003/0025032 A1 | 2/2003 | Chastang |
| 2009/0194346 A1 | 8/2009 | Fischer |
| 2012/0262708 A1 | 10/2012 | Connolly |

FOREIGN PATENT DOCUMENTS

| | | |
|---|---|---|
| FR | 1295782 A | 6/1962 |
| GB | 681077 A | 10/1952 |
| JP | S59141778 U | 9/1984 |
| JP | S61058244 U1 | 4/1986 |
| JP | S636300 A | 1/1988 |
| JP | H0389828 A | 4/1991 |
| JP | H10163288 A | 6/1998 |
| JP | H10252975 A | 9/1998 |
| JP | H10288689 A | 10/1998 |
| JP | 2000502880 A | 3/2000 |
| JP | 2004120938 A | 4/2004 |
| JP | 2008043052 A | 2/2008 |
| WO | 0160692 A1 | 8/2001 |
| WO | 2011064565 A2 | 6/2011 |

OTHER PUBLICATIONS

English Machine Translation of Takahiro et al., JP H10288689 A, Oct. 27, 1998, Translated Online Feb. 23, 2017.*
JP Decision of Rejection dated Dec. 5, 2016, for JP patent application No. 2015-523470.

* cited by examiner

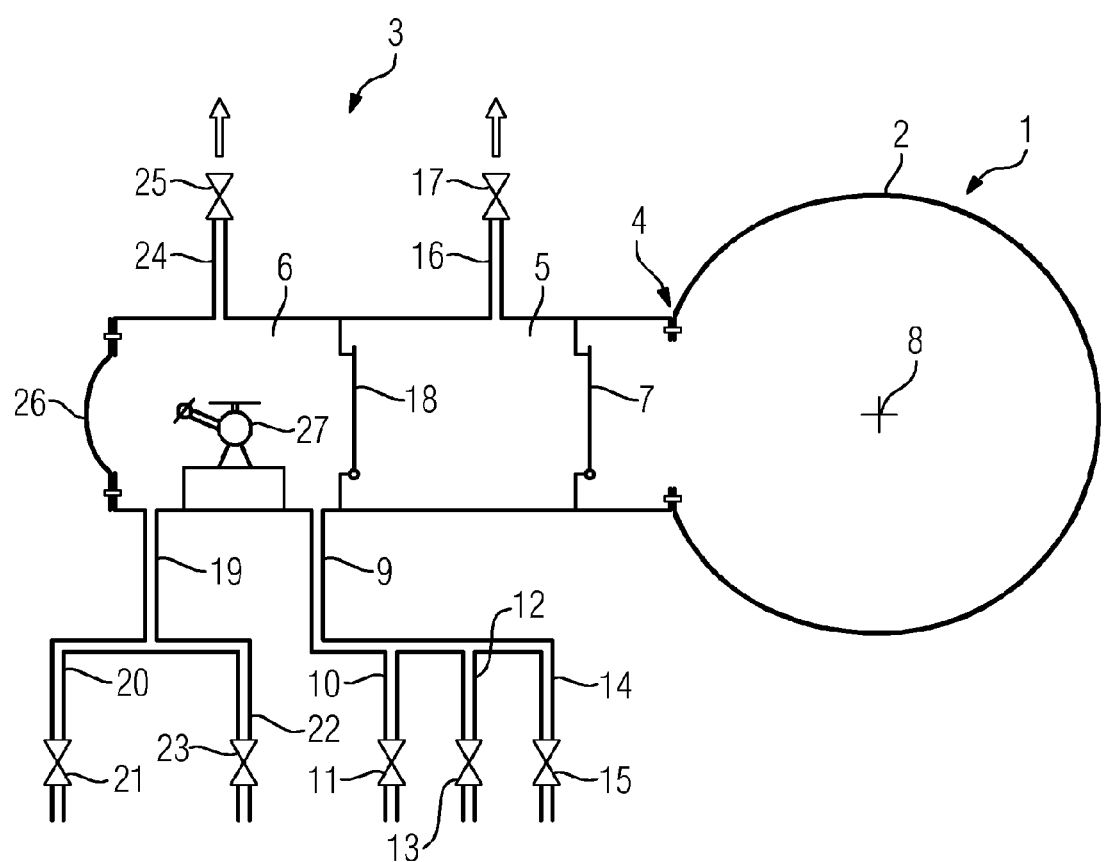

INSPECTION DEVICE FOR A MACHINE

CROSS REFERENCE TO RELATED APPLICATIONS

This application is the US National Stage of International Application No. PCT/EP2013/062470 filed Jun. 17, 2013, and claims the benefit thereof. The International Application claims the benefit of European Application No. EP12178233 filed Jul. 27, 2012. All of the applications are incorporated by reference herein in their entirety.

FIELD OF INVENTION

The invention relates to a machine which can be filled with a gas.

The invention furthermore relates to a method for monitoring and/or inspecting a machine.

BACKGROUND OF INVENTION

Machines such as hydrogen-cooled generators or other machines which can be filled with gas are designed in such a way an inspection in the interior of the machine is not possible as long as the machine is filled with the hydrogen or with gas. Therefore, sampling of particles on the surface in the interior of the machine is currently hardly possible or possible only with difficulty.

However, in order to take pictures or to carry out sampling of particles on surfaces in the case of hydrogen-cooled generators or machines which can be filled with gas, multiple steps are required in order to remove the gas from the machine. First of all, the hydrogen has to be released from the machine and this is then purged with an inert gas, such as carbon dioxide or argon. After purging with the inert gas, the generator is filled with air. After filling with air, the generator is accessible and can be inspected. However, the duration of this process is comparatively long in the case of large generators. Experience shows that such an implementation of this process can account for more than eight hours. Furthermore, a certain time period must be added since the generator has to be cooled down after operation. Only after the generator has cooled down can this be opened in order to carry out corresponding operations such as inspections.

Furthermore, after completion of the inspection operations, a certain time period is again required in order to fill the generator with hydrogen. This can also last up to eight or more hours. Furthermore, a pressure test is usually carried out, for which one day has also to be taken into account. Therefore, a week-long shutdown can be assumed overall if after the pressure test a delay is additionally incurred as a result of rectification due to leakages.

It would be desirable to curtail this time.

SUMMARY OF INVENTION

The invention, an object of which is to disclose a machine and a method with which an inspection can be quickly carried out, starts at this point.

This object is achieved by a machine, which can be filled with a gas, with a housing, wherein a first chamber is arranged on the housing, wherein a first flap valve is arranged between the housing and the first chamber, creating a fluidic connection between said housing and first chamber, and a second chamber which is arranged on the first chamber, wherein a second flap valve is arranged between the first and the second chambers, creating a fluidic connection between said first chamber and second chamber, wherein a monitoring device for inspection purposes is provided in the housing.

The externally operable flying robot, designed as a monitoring device, can be freely moved via a remote control inside the first chamber, inside the second chamber and inside the generator. This can be carried out via a radio remote control or similar transmission devices.

An object which is directed towards the method is achieved by means of a method for monitoring and/or inspecting a machine which can be filled with gas, wherein a remotely controllable monitoring device is moved into the interior of the machine via a lock system.

An embodiment of the invention is based on the aspect that a lock system is arranged on the machine in order to avoid a complete purging of the generator or of the machine. The lock system can be attached to a manhole cover of a generator, especially of an external generator. According to aspects of the invention, it is proposed to introduce a monitoring device into the hydrogen-filled generator along with the lock system in order to conduct monitoring or sampling.

To this end, the lock system comprises a first chamber which can be fluidically connected to the interior of the generator via a flap valve. Furthermore, the lock system comprises a second chamber which can be connected to the first chamber via a second flap valve. Finally, the second chamber comprises an external flap valve via which the monitoring device can be introduced. Via feed and discharge lines the first chamber and the second chamber can be filled with air, inert gas or with hydrogen. A concept of the invention is that the monitoring device, with the first flap valve and the second flap valve closed, is arranged in the first chamber and after the first chamber has been filled with hydrogen—which is present in the generator and also has the same pressure—the first flap valve is opened and the monitoring device can be moved into the interior of the generator.

Advantageous developments are disclosed in the dependent claims.

In further advantageous developments, the first chamber and the second chamber are designed with an exhaust gas line in order to draw off gases which are present in the first chamber or in the second chamber.

According to aspects of the invention, it is proposed to design the first chamber and the second chamber with a feed line so that the first and the second chambers can be filled with a gas.

The invention is explained in more detail based on an exemplary embodiment.

BRIEF DESCRIPTION OF THE DRAWINGS

In the drawing:
FIG. 1 shows a schematic overview of the machine.

DETAILED DESCRIPTION OF INVENTION

The machine is designed as a generator 1, for example, and comprises a housing 2, wherein hydrogen is contained inside the housing 2. A lock system 3, via a connection 4, is arranged on the housing 2. The lock system 3 comprises a first chamber 5 and a second chamber 6. The first chamber 5 can be fluidically connected to the interior 8 of the generator 1 via a flap valve 7. By opening the first flap valve 7, a fluidic connection between the first chamber 5 and the interior 8 of the generator is made possible. The first chamber 5 is also designed with a first feed line 9. This first feed line 9 comprises three sub-feed lines which are provided with valves. Thus, the first feed line comprises a first sub-feed line 10 with a first sub-valve 11. Via the first sub-valve 11 and the first sub-feed line 10, hydrogen can make its way into the first chamber 5. The first feed line 9 is also fluidically connected to a second sub-line 12 and to a second sub-valve 13. Via the second sub-line 12, air can flow into the first chamber 5. Furthermore, the first feed line 9 is connected to a third sub-feed line 14 and to a third sub-valve 15. Via the third sub-feed line 14, carbon dioxide ($CO_2$) can makes its way into the first chamber.

The first chamber 5 is also connected to an exhaust gas line 16 in which is arranged an exhaust gas valve 17. Via the first exhaust gas line, the gas which is present in the first chamber can escape.

Via a second flap valve 18, a fluidic connection between the second chamber 6 and the first chamber 5 is possible. The second chamber 6 comprises a second feed line 19. The second feed line 19 comprises a fourth sub-feed line 20 with a fourth sub-valve 21. Furthermore, the second feed line 19 comprises a fifth feed line 22 with a fifth sub-valve 23. Via the fourth sub-feed line, air can be conducted into the second chamber 6. Via the fifth sub-feed line 22, carbon dioxide ($CO_2$) can make its way into the second chamber 6.

The second chamber 6 furthermore comprises a second exhaust gas line 24 with a second exhaust gas valve 25. Via the second exhaust gas line 24, the gas which is present in the second chamber 6 can flow out.

Via a third flap valve 26, the lock system 3 can finally be closed.

The first chamber 5 and the second chamber 6 are arranged in series and are of a pressure-resistant and gastight design. A monitoring device in the form of a radio remotely controlled flying robot 27 can now be introduced into the second chamber 6. For this purpose, the third flap valve 26 has to be opened in advance and the second flap valve 18 and the first flap valve 7 have to be closed. The flying robot 27 can be constructed as a small helicopter and be equipped with a video camera, a spotlight and gripping tools. For controlling the robot, transmitting and receiving antennae are attached on the robot, inside the generator 1 and also inside the first chamber 5 and inside the second chamber 6.

The lock system and the monitoring device are now designed in such a way that the monitoring system can fly into the hydrogen-filled generator.

To this end, the third flap valve 26 has to be closed after the robot has been introduced into the second chamber 6. The second chamber 6 is then purged with inert gas such as $CO_2$ and then filled with air. For this purpose, the fourth sub-valve 21 and the fifth sub-valve 23 are opened and closed. After this, the robot, by opening the second flap valve 18, can be flown into the first chamber 5. After closing the second flap valve 18, the first chamber is now purged again with inert gas such as $CO_2$ and then filled with hydrogen. In this case, the hydrogen in the first chamber 5 is brought to the same pressure which also prevails in the interior 8 of the generator 1. The first flap valve 7 can then be opened and the robot can be moved into the interior 8 of the generator.

In this case, attention is to be paid to the fact that the lift force of the helicopter has to be adapted to the gas density in the interior 8 of the generator. Therefore, any accessible points in the interior 8 of the generator can now be approached in order to take pictures, for example. By means of the gripping tools, samples of encountered contaminants, such as friction dust or other deposits in the end windings, can also be taken.

The return of the robot can be carried out by means of the lock system 3 in the reverse sequence. In the second chamber 6, the samples which have been brought along can now be extracted and analyzed.

The invention claimed is:

1. A machine, which can be filled with a gas, with a housing, comprising
   a first chamber which is arranged on the housing, wherein a first flap valve is arranged between the housing and the first chamber, creating a fluidic connection between said housing and the first chamber, and
   a second chamber which is arranged on the first chamber, wherein a second flap valve is arranged between the first chamber and the second chamber, creating a fluidic connection between said first chamber and the second chamber, and
   a monitoring device provided for inspection purposes in the housing, wherein the monitoring device comprises an externally operable flying robot, and
   wherein the first flap valve and the second flap valve are configured to permit the monitoring device to pass there through when open.

2. The machine as claimed in claim 1,
   wherein the first chamber and the second chamber are designed as a lock system.

3. The machine as claimed in claim 1,
   wherein the first chamber is designed with an exhaust gas line.

4. The machine as claimed in claim 1,
   wherein the second chamber is designed with an exhaust gas line.

5. The machine as claimed in claim 1,
   wherein the first and the second chamber comprise a feed line.

6. The machine as claimed in claim 1,
   wherein the second chamber has a flap valve which can be closed from the outside.

7. A method for monitoring and/or inspecting a machine which can be filled with gas, comprising
   moving a remotely controllable monitoring device into the interior of the machine via a lock system,
   wherein the lock system comprises a first chamber and a second chamber, wherein in a first step the first chamber is purged with an inert gas and then filled with air, and in a second step the second chamber is purged with an inert gas and then filled with air, and in a further step the monitoring device is brought into the first chamber and the first chamber is then filled with the same gas as the gas which is present in the interior of the machine.

8. The method as claimed in claim 7,
   wherein the first chamber is brought to the essentially same pressure as in the interior of the machine.

* * * * *